ium Examiner—Harold Ansher

United States Patent [19]

Breidt, Jr. et al.

[11] 4,147,827
[45] Apr. 3, 1979

[54] COEXTRUDED HEAT SEALABLE LAMINAR THERMOPLASTIC FILMS

[75] Inventors: Peter Breidt, Jr., Webster; Thomas W. Higgins, Penfield; A. Michael Nahmias, Canandaigua; Milton L. Weiner, Rochester, all of N.Y.

[73] Assignee: Mobil Oil Corporation, New York, N.Y.

[21] Appl. No.: 848,435

[22] Filed: Nov. 4, 1977

[51] Int. Cl.$^2$ .................... B32B 27/32; B32B 27/08
[52] U.S. Cl. ................................. 428/218; 428/213;
428/349; 428/355; 428/517; 428/519; 428/521;
428/523; 428/910; 428/913
[58] Field of Search .............. 428/910, 913, 213, 218,
428/349, 354, 355, 516, 523, 517, 519, 521

[56] References Cited

U.S. PATENT DOCUMENTS

| | | | |
|---|---|---|---|
| 3,088,844 | 5/1963 | Hungerford et al. | 428/349 X |
| 3,236,675 | 2/1966 | Hermitte et al. | 428/349 |
| 3,285,766 | 11/1966 | Barkis et al. | 428/349 |
| 3,519,531 | 7/1970 | James et al. | 428/349 X |
| 3,600,267 | 8/1971 | McFedries et al. | 428/349 |
| 4,085,244 | 4/1978 | Stillman | 428/910 X |

*Primary Examiner*—Harold Ansher
*Attorney, Agent, or Firm*—Charles A. Huggett; James D. Tierney

[57] ABSTRACT

Laminar thermoplastic films are provided which exhibit improved heat seal strengths as well as heat seal temperature ranges. The laminates comprise a predominantly propylene-based polymer substrate or core, the propylene core layer being coated with continuous skins, the skins being fabricated from ethylene based resin with a density of less than 0.939.

2 Claims, No Drawings

COEXTRUDED HEAT SEALABLE LAMINAR THERMOPLASTIC FILMS

BACKGROUND OF THE INVENTION

1. Field of the Invention

The present invention relates to laminar thermo-plastic film structures which are formed by coextrusion of the molten laminar layers through a single die orifice and particularly such laminar structures that are solidified after extrusion and passed onto an orientation or stretching operation to produce a biaxially oriented laminate film. The film is characterized by having good heat seal strengths, broad heat temperature ranges and excellent impact resistance.

2. Description of the Prior Art

Oriented polypropylene films have become useful and widely employed packaging films primarily because of their good moisture barrier properties, stiffness, improved machine-ability, high strength characteristics and excellent optical properties such as high gloss and minimal haze. Such biaxially oriented polypropylene films are quite difficult to seal because of the tendency of such films to deorient, pucker or tear at the requisite sealing temperatures. Consequently, in order to achieve satisfactory heat sealability, coatings of various types have been applied to the polypropylene film surface to lower the requisite heat seal temperatures. Generally, such coatings are applied in a separate operation after the film has been formed and oriented. Many times the coatings must be applied from solution in an organic solvent media. This separate operation for application of relatively expensive coatings which dictate employment of solvent recovery systems is quite costly. Examples of such coatings which have been employed in the past to impart heat sealability and other desirable characteristics to the polypropylene film include saran and acrylic multipolymer coatings.

An alternate method for imparting improved heat sealability to oriented polypropylene film, and one that is less costly than post orientation coating, comprises the coextrusion of surface layers of a lower melting resin onto the surface of the higher melting polypropylene core prior to orientation. Following orientation a product is obtained which has a relatively thick polypropylene core sandwiched between two relatively thin layers or skins of the low melting resin. However, as practiced in the prior art, this procedure has associated with it certain deficiencies. For example, in an instance where it is desirable to form a laminar structure comprising a thermoplastic core sandwiched between layers of a lower melting point material such as an ethylene propylene copolymer to provide heat sealability, the resulting laminar structure exhibits desirable high heat seal strengths but because of the relatively high melting point of such a copolymer layer, the heat sealing range, defined by the temperature at which usable seal strengths are formed and that temperature where undesirable film shrinkage occurs, is narrow.

In other instances in the prior art when a coextruded film comprising a low melting skin material is employed as the coating or skin layer, e.g., a medium density polyethylene resin produced by the high pressure, free radical catalyst process, a product is produced which exhibits a much wider sealing range than that of the hereinabove described coextruded film, however, its seal strengths are undesirably low. Additionally, since very low machine direction stretch ratios must be employed, such films are oriented only to a slight degree in the machine direction and as a result the film's toughness or impact strength is not as high as would be desired. Improvement of the toughness characteristics of the film, by imparting a greater machine direction stretch to the film while maintaining the heat seal advantages of the polyethylene skin could not be achieved because the higher temperatures which would be required to permit greater machine direction stretching would also cause undesirable sticking of the polyethylene skin to the stretching rolls.

SUMMARY OF THE INVENTION

The present invention is directed to the manufacture of a biaxially oriented film that is heat sealable over a wide range of temperatures and which has high heat seal strength. Such films are obtained by the coextrusion of a surface layer of a polyethylene resin or predominantly ethylene based copolymer surrounding a core of a predominantly propylene-based polymer, the core composition being selected so that the temperature required for machine stretching, i.e. orientation in the machine direction, will not be so high as to cause sticking of the laminar film skin surface to the surface of the orientation or stretching rollers. Additionally, the laminar film structures show exceptionally high heat seal strength when contrasted to prior art film laminations, superior optical properties includng haze and gloss, and high strength and toughness characteristics. Suitable core compositions include either (a) a random ethylene/propylene copolymer, (b) a block ethylene/propylene copolymer, (c) a mixture of polypropylene with a glassy, compatible resin of low softening temperature, or (d) a mixture of a random or a block ethylene/propylene copolymer with a glassy, compatible resin of low softening temperature. The glassy compatible resins of low softening temperature may be those resins which are described in U.S. Pat. Nos. 3,865,903 and 3,937,762, the disclosures of those patents beng incorporated herein by reference. It will be noted that such glassy resin compositions as disclosed in those patents comprise essentially an aliphatic diene material such as pentadiene which has been copolymerized with at least one other olefinically unsaturated comonomer. These glassy resins serve essentially as high temperature plasticizers. Since they are highly compatible with the core resin they do not impair the optical properties of the laminar product and in most instances they have been found to improve the optics of the final laminar product.

The present invention includes a method for the production of the hereinabove described heat sealable coextruded films, which comprises the coextrusion of a high melting point core layer which is coated on at least one or both surfaces with a lower melting, relatively thin skin layer based on polyethylene. The laminate structure is subsequently oriented in both the machine and transverse direction and the resultant laminar film may be heat sealed at temperatures below which disorientation of the core material occurs.

The preferred stretch ratios employed in the present invention to obtain satisfactory machine direction orientation levels are from about 3.0:1 up to about 10.0:1 and preferably from about 4.0:1 up to about 7.0:1.

Uncoated, homopolymer, polypropylene resins which are machine direction oriented to the desired levels hereinabove defined must be heated to temperatures on the order of from about 285° F. up to about 305° F. Hence, if an unmodified polypropylene core were coated with a low melting point resin, e.g. low density polyethylene and stretched at ratios high enough to achieve satisfactory levels of machine direction orientation (necessitating temperatures on the order of 285° to 305° F.) the lower melting polyethlyene casting melts and sticks to the stretching rollers making high level machine direction stretch ratios with such a laminar combination impossible to achieve.

The method of the present invention includes the employment of a core or central resin layer which has a composition such that machine direction orientation temperatures can be employed which, while permitting a desirable degree of machine direction orientation to be carried out, will not be so high as to cause sticking of the lower melting film surface layers to the machine direction stretching rollers. Although such machine direction stretching temperature may vary dependent upon the exact compositions of the laminar core and surface or skin layers, temperatures on the order of from about 200° F. up to about 240° F. have been found to be generally suitable, the preferred machine direction stretching temperature range being on the order of from about 215° F. up to about 235° F.

Accordingly the thermoplastic film laminates of the present invention comprise a single core layer, the core layer being coated with relatively thin skin layers on one or both surfaces thereof, the core layer comprising a member selected from the group consisting of (1) ethylene-propylene copolymers; (2) blends of ethylene-propylene copolymers with an aliphatic diene copolymer; and (3) blends of polypropylene homopolymer with an aliphatic diene copolymer; said skin or surface layers comprising polyethylene and copolymers of ethylene with olefinically unsaturated comonomers.

In the case of the laminar film constructions of the present invention the lower melting point skin or surface layers are considerably thinner than the central or core layer, each of the skin layers constituting from about 1% up to about 10% of the overall thickness of the laminate. The polyethylene homopolymer or copolymer which comprises the skin layer should have a density of from about 0.910 up to about 0.939 and a melt index range of from about 0.3 up to about 20.0 and preferably from about 3.0 to about 6.0. In the case of the employment of ethylene copolymers as a surface or skin layer the ethylene content of the copolymer should be at least about 80% and preferably 90% or more. Typical examples of such copolymers include ethylene copolymerized with lower alkyl acrylates, butene, pentene, hexene, octene, α-β monoethylenically unsaturated carboxylic acids including acrylic and methacrylic acids, methyl pentene, vinyl acetate and the like.

DESCRIPTION OF SPECIFIC EMBODIMENTS

In accordance with the present invention, the laminar film structures thereof are made by the coextrusion of the skin resin and the core composition simultaneously, utilizing any of the prior art methods of coextrusion. The extrudate is solidified by cooling it in a water bath or on a casting roll. The solid base sheet is reheated and stretched in the machine direction utilizing a series of rotating draw rollers, in accordance with the prior art and finally the machine direction oriented film is stretched in the transverse direction by employing well known transverse direction stretching apparatus for film orientation such as a tenter. Specific examples of the present invention are described hereinbelow and are presented for illustrative purposes only and, accordingly, should not be construed in a limitative sense with respect to the scope of the present invention.

EXAMPLE 1

A three layer coextrudate was produced comprising a core of a random ethylene/propylene copolymer having a melt flow rate of 5.4; a density of 0.90 and an ethylene content of 3.0% by weight, and surface layers of a copolymer of ethylene and 4-methylpentene-1, identified by the manufacturer as a linear low density resin. The copolymer was produced by the utilization of a low pressure polymerization process and is characterized by having a 4-methylpentene-1 content of 1.07 mole percent, a melt index of 3.0 and a density of 0.935. Each surface layer constituted approximately 6% of the overall thickness. The base film was quenched on a casting roll having a surface temperature of 110° F. and was subsequently reheated to 218° F. The preheated base sheet was drawn 5 times in the machine direction between heated rollers which were driven at an approximate speed differential and subsequently tentered or stretched in the transverse direction 7.5 times at a temperature of about 285° F.

The machine direction orientation assembly comprised a series of 4 sequentially positioned preheating rollers which preheated the film to about 218-220° F., followed by a set of two stretching rollers, the second of which is driven at a speed higher than the first or slow roller. Film stretching or orientation in the machine direction occurs between the closely positioned stretching rollers. In the present example in order to achieve a stretch ratio of 5:1 the surface speed of the first stretching roll as 10 ft./min. while the second or fast roller had a surface speed of 50 ft./min.

EXAMPLE 2

The procedure of Example 1 was followed except that the surface layer or skin material comprised an ethylene/4-methylpentene-1 copolymer skin resin having a 4 methylpentene content of 2.0 mole percent, a density of 0.925 and a melt index of 3.0.

EXAMPLE 3

The procedure of Example 1 was followed except that the surface layers comprised a polyethylene homopolymer resin produced by the high pressure, free radical catalyzed process, and having a density of 0.935 and a Melt Index of 3.0.

EXAMPLE 4

The procedure of Example 3 was followed except that the core material comprised a mixture of 84% polypropylene homopolymer and 16% of a glassy, compatible, random interpolymer resin. The interpolymer resin was prepared by anhydrous aluminum chloride catalyzed interpolymerization in toluene of a mixture comprising by weight 55.3% of a piperylene concentrate; 9.7% of a mixture comprising dipentene and β-phellandrene present in a weight ratio of about 2:1, respectively; and 35.0% of α-methylstyrene.

| | |
|---|---|
| Melting Point, ° C. (Ball and Ring) | 79 – 80 |
| Molecular Weight (Weight Average) (Number Averge) | 1442 1034 |
| Bromine No. | 6 – 10 |

| | |
|---|---|
| Iodine No. | 75 – 80 |
| Acid Value | <1 |
| Specific Gravity | 0.978 – 0.980 |
| Percent Crystallinity | 0 |
| Tg (Glass Transition Temperature) | 32° C. |
| Saponification No. | <1 |
| Viscosity (in toluene — 70%) | f to g |
| Color (50% toluol solution) | Gardner 5 – 7 |
| Decomposition Temperature (in nitrogen) | 205° C. |

The resinous interpolymer, when heated under nitrogen at a rate of 10° C., per minute, had an initial decomposition temperature of 205° C.; a 0.0% weight loss at 200° C. a 12.8% weight loss of 300° C.; and a 90.0% weight loss at 400° C.

The polypropylene homopolymer resin employed was identified by the manufacturer as Tenite-612, having a melt flow of 4.0 to 5.0 and a molecular weight of 340,000 to 380,000 (weight average) and 34,000 to 39,000 (number average). The polypropylene resin was also characterized by the following physical properties:

| | |
|---|---|
| Crystalline Melting Point (° F.) | 330 – 340 |
| Inherent Viscosity | 1.4 – 1.6 |
| Density | 0.910 – 0.890 |

EXAMPLE 4-A

The procedure of Example 4 was followed except that the surface layers comprised an ethylene-vinyl acetate copolymer having a vinyl acetate content of 4.5 mole percent; a melt index of about 1.0; and an apparent density of 0.927.

EXAMPLE 5

For comparison purposes a multilayer laminate was prepared utilizing the process as shown in Example 1, except that the skin comprised an ethylene/propylene random copolymer, having an ethylene content of approximately 3% by weight, and the core comprised a polypropylene homopolymer. The ethylene-propylene copolymer and the polypropylene homopolymer resins employed were the same as those identified in Examples 1 and 4 respectively. The Example 1 process was modified to the extent that the present temperature of the laminar base film prior to machine direction orientation was increased to 275° F.

EXAMPLE 6

For comparison purposes another coextruded film was prepared in a similar fashion to that of Example 1 except that it was only drawn 1.4 times in the machine direction prior to stretching it 7.5 times transversely. The film comprised a polypropylene homopolymer core resin (as described in Example (4) having surface skins consisting of a mdeium density polyethylene resin that was produced by the high pressure free radical cartalyzed process and that was additionally characterized by having a density of 0.935 and a melt index of 3.5. It is noted that attempts to achieve a higher machine direction draw with this laminar combination, i.e. by increasing the machine direction preheat temperature up to about 275° F. resulted in the polyethylene skin layers sticking to the machine direction orienting rollers whereby production of satisfactory film was not possible.

The heat seal properties of the laminates which were prepared in accordance with Examples 1 through 6 are set forth in the following Table I. It can be seen that the heat seal characteristics of the laminar films of the prior art, i.e. films made in accordance with Examples 5 and 6, are inferior to the laminates of the present invention as described in Examples 1, 2, 3, 4 and 4-A. While the prior art film of Example 5 provides a high heat seal strength, it only does so at a high sealing temperatuer eand therefore the temperature range over which high heat seal strengths can be attained with this lamination is narrow. As can be seen from the data set forth in th following Tables, the laminar film structures of the present invention consistently exhibit wide heat seal ranges and toughness which are superior to the prior art film laminates. Such wide sealing ranges and toughness characteristics are essential in the packaging end use applications for the laminar film constructions of the present invention. Additionally in certain packaging applications, high heat seal strength characteristics are particularly desirable. Utilizing the film laminates of this invention, in addition to the hereinbefore described toughness properties and wide sealing ranges, in many instances high heat seal characteristics are also obtainable. Additionally, as illustrated in Table 2, the laminated films of the present invention, in contrast to those of the prior art, i.e. Examples 5 and 6, provide improved optical properties, including reduced haze and higher gloss.

The beneficial effect on film toughness, e.g., impact strength which is achieved with the higher machine direction orientation which is made possible by the provisions of the present invention is shown by the data as set forth in Table 3. It will be seen that the prior art film of Example 6 is substantially less tough than the films of Examples 1 through 4-A.

TABLE 1

Film Laminates Produced In Accordance With:

| Sealing Temperature ° F. | Seal Strength (grams/linear inch) | | | | | | |
|---|---|---|---|---|---|---|---|
| | 240 | 250 | 260 | 270 | 280 | 290 | 300 |
| Example 1 | 0 | 20 | 300 | 475 | 530 | 555 | — |
| Example 2 | 65 | 235 | 590 | 730 | 805 | 680 | — |
| Example 3 | 0 | 0 | 145 | 125 | 125 | 150 | — |
| Example 4 | 60 | 180 | 180 | 200 | 270 | 340 | — |
| Example 4-A | 200 | 230 | 200 | 205 | 250 | 220 | — |
| Example 5 | 0 | 0 | 0 | 0 | 0 | 200 | 600 |
| Example 6 | 0 | 0 | 190 | 260 | 245 | 305 | — |

TABLE 2

| Laminates Produced In Accordance With: | Haze* | Gloss** |
|---|---|---|
| Example 1 | 2.4 | 79.8 |
| Example 2 | 1.3 | 83 |
| Example 3 | 1.2 | 79.5 |
| Example 4 | 2.0 | 85 |
| Example 4-A | 2.0 | 80 |
| Example 5 | 4.4 | 73.6 |
| Example 6 | 6.5 | 60 |

*ASTM - D 1003-61
**ASTM - D2457-70

TABLE 3

| Laminates Produced In Accordance With: | Ball Burst cm-kg./mil |
|---|---|
| Example 1 | 27.0 |
| Example 2 | 28.1 |

TABLE 3-continued

| Laminates Produced In Accordance With: | Ball Burst cm-kg./mil |
|---|---|
| Example 3 | 20.9 |
| Example 4 | 20.0 |
| Example 4-A | 20.0 |
| Example 5 | 22.0 |
| Example 6 | 3.0 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A heat sealable, biaxially oriented, coextruded thermoplastic film laminate comprising a core layer, at least one surface of the core layer having laminated thereto a skin layer, said core layer comprising a member selected from the group consisting of (1) ethylene/propylene copolymers; (2) blends of ethylene/propylene copolymer with an aliphatic diene copolymer; and (3) blends of polypropylene homopolymer with an aliphatic diene copolymer, said skin layers comprising an ethylene based polymer having a density of from about 0.910 to about 0.939 and a melt index of from about 0.3 up to about 20.0 and an ethylene content of at least about 80 percent; said laminate being further characterized wherein said core layer has a relatively higher melting point than said skin layer.

2. A heat sealable biaxially oriented, coextruded thermoplastic film laminate in accordance with claim 1 wherein said skin layer comprises a member selected from the group consisting of polyethylene, ethylene-vinyl acetate copolymer and ethylene-4-methylpentene-1 copolymer.

* * * * *